United States Patent
Kuttenberger et al.

(10) Patent No.: US 7,540,532 B2
(45) Date of Patent: Jun. 2, 2009

(54) APPARATUS FOR TRIGGERING RESTRAINT MEANS

(75) Inventors: Alfred Kuttenberger, Moeglingen (DE); Marc Theisen, Besigheim (DE); Michael Bunse, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 10/514,334

(22) PCT Filed: Nov. 18, 2003

(86) PCT No.: PCT/DE03/03819

§ 371 (c)(1), (2), (4) Date: Nov. 11, 2004

(87) PCT Pub. No.: WO2004/110821

PCT Pub. Date: Dec. 23, 2004

(65) Prior Publication Data

US 2005/0168329 A1    Aug. 4, 2005

(30) Foreign Application Priority Data

Jun. 12, 2003    (DE) ............................... 103 26 563

(51) Int. Cl.
*B60R 21/013* (2006.01)
*B60R 21/0134* (2006.01)

(52) U.S. Cl. .................. 280/735; 180/271; 701/45; 701/301; 340/903; 342/72; 367/96

(58) Field of Classification Search ................ 280/735; 180/271; 701/45, 301, 117; 340/903, 435; 367/96; 342/72; 382/104, 107
See application file for complete search history.

(56) References Cited

U.S. PATENT DOCUMENTS

| 3,760,415 | A  | * | 9/1973  | Holmstrom et al. ........... 342/59 |
| 6,031,484 | A  | * | 2/2000  | Bullinger et al. .............. 342/72 |
| 6,087,928 | A  |   | 7/2000  | Kleinberg et al. |
| 6,516,258 | B1 | * | 2/2003  | Herrmann ..................... 701/45 |
| 2002/0112911 | A1 |  | 8/2002  | Recknagel |
| 2003/0051530 | A1 |  | 3/2003  | Eisele et al. |
| 2003/0191568 | A1 | * | 10/2003 | Breed .......................... 701/36 |

FOREIGN PATENT DOCUMENTS

DE    101 41 886    3/2003
DE    198 15 002    10/2003

\* cited by examiner

*Primary Examiner*—John Q. Nguyen
*Assistant Examiner*—George D. Spisich
(74) *Attorney, Agent, or Firm*—Kenyon & Kenyon LLP

(57) ABSTRACT

An apparatus for triggering a restraint apparatus, arrangement(s) or structure(s) in which, with a precrash sensor system, the apparatus generates a signal as a function of which the restraint apparatus, arrangement(s) or structure(s) is/are triggered. The precrash sensor system includes a combination of an ultrasound sensor system and a microwave sensor system. The ultrasound sensor system serves to detect objects at a speed of up to 40 km/h, while the microwave sensor system is used to detect objects up to a relative speed of 200 km/h.

4 Claims, 2 Drawing Sheets

APPARATUS FOR TRIGGERING RESTRAINT MEANS

FIELD OF THE INVENTION

The present invention is based on an apparatus for triggering the restraint apparatus, arrangement(s) or structure(s).

BACKGROUND INFORMATION

German patent document no. 198 15 002 discusses the triggering of the restraint apparatus, arrangement(s) or structure(s) as a function of a signal from a precrash sensor system.

SUMMARY OF THE INVENTION

The exemplary apparatus of the present invention for triggering the restraint apparatus, arrangement(s) or structure(s) has the advantage by comparison that as the precrash sensor system, a combination of an ultrasound sensor system and a microwave sensor system is now used. This makes allows for using the ultrasound sensor system with a wide opening angle for low relative speeds between an object and the vehicle, while the microwave sensor system is used to detect the object at a high relative speed between the object and the vehicle. This makes use of the finding that in accidents at a high relative speed, a head-on collision can usually be expected, and in that case the microwave sensor system is used, with a narrow opening angle but for high speeds. In terms of the relative speed, the ultrasound sensor system, because of its greater damping and the propagation speed in air, can be used only for low speeds up to about 40 km/h. However, 80% of all accidents happen at that speed or below. With a microwave sensor system embodied as radar, particularly at 77 GHz, a relatively great range can conversely be detected, and thus objects with a considerably higher speed relative to the vehicle, for instance up to 200 km/h. With this speed-adapted object detection by various sensor systems, the restraint apparatus, arrangement(s) or structure(s) may then be triggered, both irreversibly, as in the case of air bags or belt tighteners, or reversibly, as in the case of belt tighteners, with precision with respect to time and situation. This provides for achieving a precise separation between tripping and nontripping of the restraint apparatus, arrangement(s) or structure(s). Along with precrash sensors, collision sensors and acceleration sensors can also generate signals that affect the triggering of the restraint apparatus, arrangement(s) or structure(s). The ultrasound sensor system has the advantage in particular that it can detect objects in the low speed range over the entire width of the vehicle.

By the provisions and refinements described herein, advantageous improvements to the apparatus for triggering the restraint apparatus, arrangement(s) or structure(s) are also described herein.

It may be especially advantageous that the ultrasound sensor system is used up to a relative speed of 40 km/h, and above that the microwave sensor system is used. The latter may be used up to a speed of 200 km/h. The microwave sensor system is used as radar at 77 GHz. Besides the pulse echo method, other modulation methods may also be used, such as a frequency-modulated continuous wave method or a frequency-modulated pulsed method.

Advantageously, the speed determination, as a function of which the apparatus selects the ultrasound sensor system or the microwave sensor system for object detection, is determined by the microwave sensor system, since it is capable of determining this relative speed over a wider relative speed range.

DETAILED DESCRIPTION

According to the exemplary embodiment and/or exemplary method of the present invention, with the aid of a combination of an ultrasound sensor system and a microwave sensor system, the latter system being embodied as radar at 77 GHz, information such as the relative speed between the vehicle and the object, the time to impact (TTI) or in other words the time until a collision occurs, the offset, the overlap, and the object class may all be sensed and made available to the control unit for the restraint apparatus, arrangement(s) or structure(s), as a result of which the restraint apparatus, arrangement(s) or structure(s) is then triggered.

Figure 1:
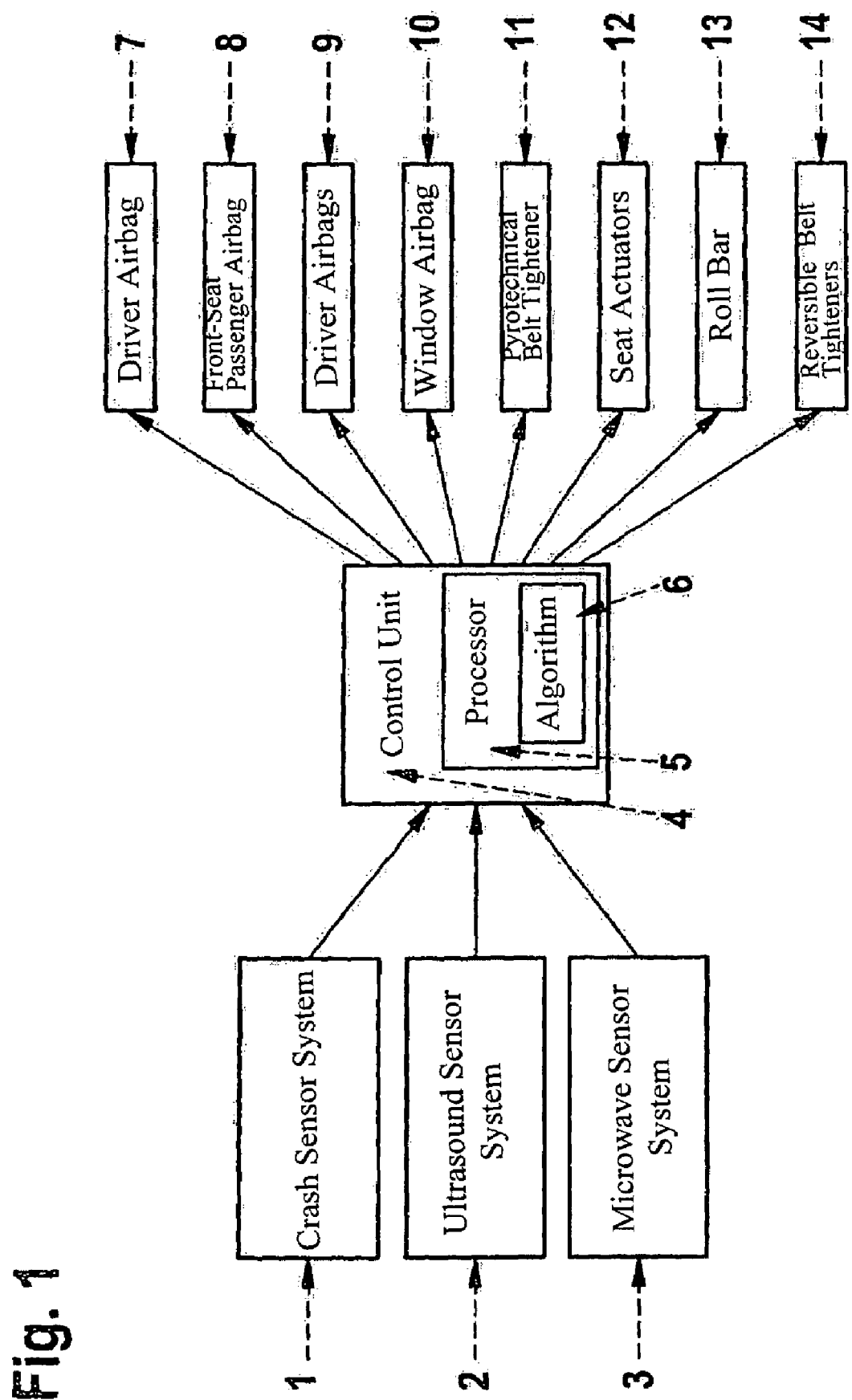
FIG. 1 shows a block circuit diagram of the exemplary apparatus of the present invention.

FIG. 1, in a block circuit diagram, illustrates the exemplary apparatus of the present invention. A crash sensor system 1 is connected to a first data input of a control unit 4 for the restraint apparatus, arrangement(s) or structure(s). An ultrasound sensor system 2 is connected to a second data input, while a microwave sensor system 3 is connected to a third data input. For processing the sensor signals from sensor systems 1 through 3, control unit 4 includes a processor 5, in which an algorithm 6 for triggering the restraint apparatus, arrangement(s) or structure(s) is calculated. The signals of the precrash sensor system, that is, of ultrasound sensor system 2 and microwave sensor system 3, are used to determine the relative speed and the time to impact.

As a function of these parameters, a reversible restraint apparatus, arrangement(s) or structure(s) such as a belt tightener may be triggered, and an irreversible restraint apparatus, arrangement(s) or structure(s) may also be parametrized in order to be adjusted optimally to the severity of the accident and the moment of the accident. If crash sensor system 1 detects an incipient impact, the triggering of the restraint apparatus, arrangement(s) or structure(s) is then done by processor 5.

These then also include the irreversible restraint apparatus, arrangements) or structure(s), such as air bags and pyrotechnical belt tighteners, as well as roll bars. Seat actuators may also already be triggered in the same phase in which the reversible restraint apparatus, arrangement(s) or structure(s) is triggered. For triggering the restraint apparatus, arrangement(s) or structure(s), control unit 4 is in communication with a driver air bag 7, a front-seat passenger air bag 8, knee air bags 9, a window air bag 10, a pyrotechnical belt tightener 11, seat actuators 12, a roll bar 13, and reversible belt tighteners 14. The restraint apparatus, arrangement(s) or structure(s) may not be available in a given vehicle, and the restraint apparatus, arrangement(s) or structure(s) may vary in number. For instance, 4, 8 or 16 air bags may be installed in a vehicle.

At present, ultrasound sensor system 2 has a detection range of 3 meters. However, it has a wide opening angle, so that the area in front of the vehicle can be seamlessly monitored. Because of the limited range and other peripheral conditions, a speed measurement of only up to about 40 km/h is currently possible. However, approximately 80% of all accidents happen at that speed or below. Signals from the ultrasound sensor system, as a precrash sensor system, are therefore highly useful for triggering the restraint apparatus, arrangement(s) or structure(s). The decisive parameter here is the relative speed between the vehicle and the object.

With this information from the precrash sensor system, a precise separation between tripping and nontripping may be achieved. In the event that the irreversible restraint apparatus, arrangement(s) or structure(s) is/are activated, then compared to a purely acceleration-based algorithm, the tripping may be further improved on the basis of the additionally obtained data. Moreover, even in the lower speed range, activation of the reversible restraint apparatus, arrangement(s) or structure(s) may be achieved using ultrasound sensor system 2.

In contrast, with microwave sensor system 3, because of its narrow opening angle, only a narrow area in front of the vehicle is detectable. However, with microwave sensor system 3, speeds of up to 200 km/h may be detected. Thus this information may be used in air bag control unit 4 for optimal activation of the restraint apparatus, arrangements or structures 7 through 14. These restraint apparatus then include both reversible and irreversible restraint apparatus.

If both sensors, that is, ultrasound sensor system 2 and microwave sensor system 3, are considered together, then the range of accidents may be expanded still further. With ultrasound sensor system 2, for instance, accidents in the low speed range may be detected over the entire width of the vehicle, while with microwave sensor system 3 accidents at higher speed, which are predominantly of the head-on type, are detected.

Figure 2:
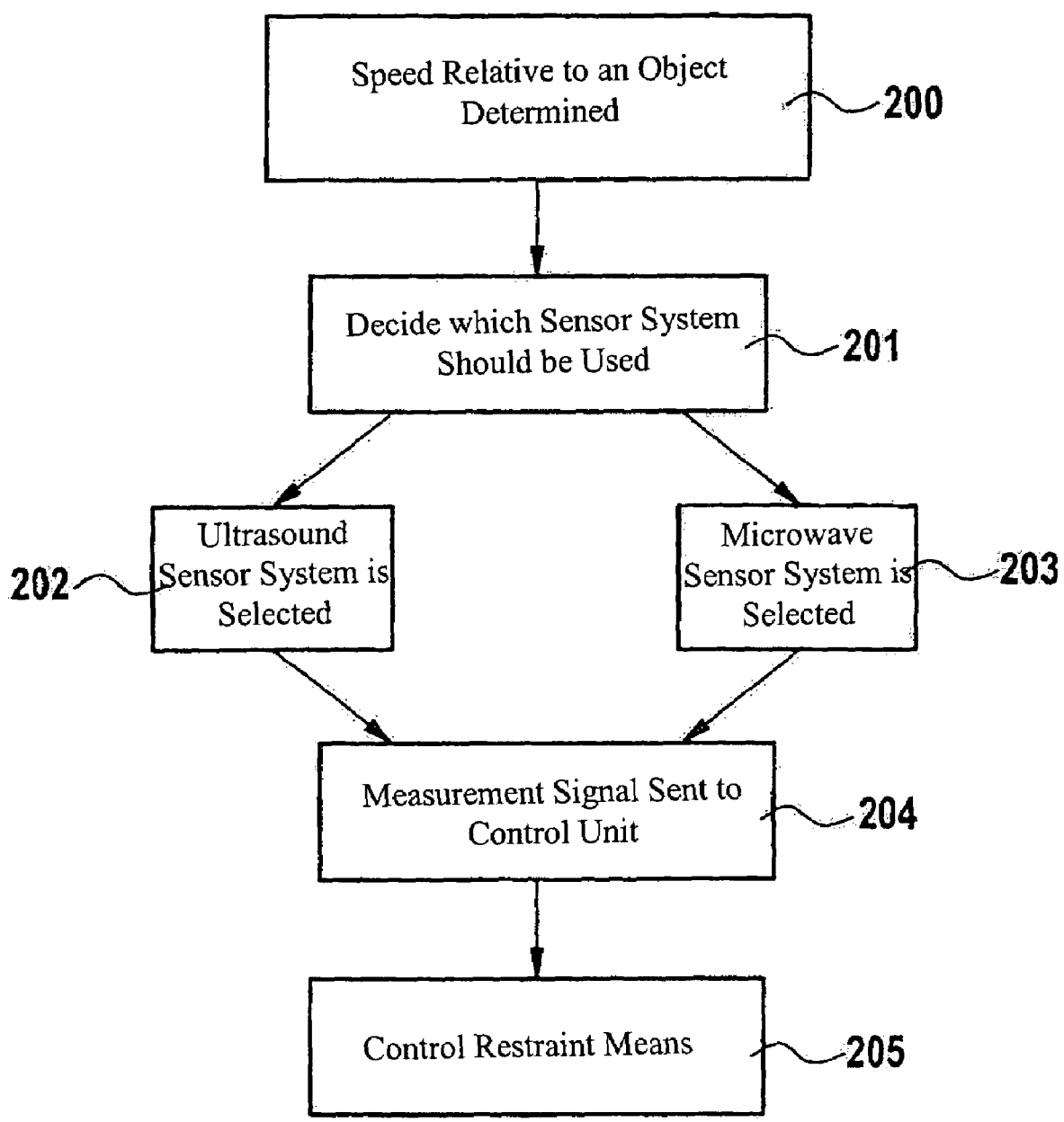
FIG. 2 is a flow chart of the exemplary method.

FIG. 2 shows a flow chart which explains the mode of operation of the exemplary embodiment of the present invention. In method step 200, a speed relative to an object is determined. For that purpose, microwave sensor system 3 is used. From this relative speed, a decision is then made as to which of the sensor systems, that is, ultrasound sensor system 2 or microwave sensor system 3, should be used for object detection. This is done in method step 201. If the speed is below 40 km/h, for instance, then in method step 202 ultrasound sensor system 2 is selected. However, if the speed is above 40 km/h, then in method step 203 microwave sensor system 3 is used. Whichever sensor system is selected then sends a measurement signal to control unit 4. This is done in method step 204. As a function of this signal, processor 5, with its algorithm 6, then triggers appropriate restraint apparatus, arrangements or structures 7 through 14, in method step 205.

Both ultrasound sensor system 2 and radar sensor system 3 include a transmission module for sending a test signal and a receiving module for receiving the reflected signal. The distance may be calculated from the transit time and the speed of the transmitted test signal. By using a plurality of such transceiver modules, the direction may also be determined. The amplitude of the received signal also makes provides for deciding what the transit time is, via the damping.

Microwave sensor system 3, which is operated at 77 GHz, includes an oscillator mixer and a transmitter for emitting the radar signal. A receiving system is also provided, which is for instance connected to the same antenna in order to operate it as a transmitting and receiving antenna. The receiving system also includes mixers for mixing the received signal downward, in order then to provide a receiving circuit depending on the type of modulation selected. Ultrasound sensor system 2 includes ultrasound sensor transducers, which emit ultrasound waves and also receive them again in order to convert them into electrical signals. In ultrasound sensor system 2, a pulse echo method is typically employed.

What is claimed is:

1. An apparatus for triggering at least one restraint arrangement, comprising:
   an ultrasound sensor system;
   a microwave sensor system; and
   a precrash sensor system, wherein the at least one restraint arrangement is triggered as a function of at least one signal of the precrash sensor system;
   wherein the precrash sensor system includes the ultrasound sensor system configured to detect at least a first object at a low relative speed and the microwave sensor system configured to detect a second object at a high relative speed, and the ultrasound sensor system and the microwave sensor system generate the at least one signal, and wherein the apparatus is configured to select, as a function of a relative speed determination, one of the ultrasound sensor system to detect the first object or the microwave sensor system to detect the second object.

2. The apparatus of claim 1, wherein the ultrasound sensor system detects the first object at a relative speed of up to 40 km/h, and the microwave sensor system detects the second object at a relative speed of up to 200 km/h.

3. The apparatus of claim 2, wherein the microwave sensor system emits microwaves at 77 GHz.

4. The apparatus of claim 1, wherein the microwave sensor system emits microwaves at 77 Ghz.

* * * * *